(12) United States Patent
Behzadpour et al.

(10) Patent No.: US 11,321,501 B2
(45) Date of Patent: May 3, 2022

(54) COMPOSITE STRUCTURE WARPAGE CONTROL SYSTEM

(71) Applicant: The Boeing Company, Chicago, IL (US)

(72) Inventors: Forouzan Behzadpour, Woodinville, WA (US); Patrick Bickford Stickler, Everett, WA (US)

(73) Assignee: The Boeing Company, Chicago, IL (US)

( * ) Notice: Subject to any disclaimer, the term of this patent is extended or adjusted under 35 U.S.C. 154(b) by 367 days.

(21) Appl. No.: 16/551,126

(22) Filed: Aug. 26, 2019

(65) Prior Publication Data

US 2021/0064720 A1    Mar. 4, 2021

(51) Int. Cl.
| | | |
|---|---|---|
| *G06F 30/15* | (2020.01) | |
| *G06F 30/20* | (2020.01) | |
| *G06F 30/17* | (2020.01) | |
| *B64D 47/00* | (2006.01) | |

(52) U.S. Cl.
CPC ............ *G06F 30/15* (2020.01); *B64D 47/00* (2013.01); *G06F 30/17* (2020.01); *G06F 30/20* (2020.01)

(58) Field of Classification Search
CPC ......... B64D 47/00; G06F 30/15; G06F 30/20; G06F 30/17; G06F 30/00
USPC ........................................................ 703/8, 6
See application file for complete search history.

(56) References Cited

U.S. PATENT DOCUMENTS 6,692,681 B1 * 2/2004 Lunde ................. B29C 70/342
264/510

2015/0142149 A1 * 5/2015 Collier ................... G06F 30/00
700/98

FOREIGN PATENT DOCUMENTS

| EP | 2671707 A1 * | 12/2013 | ............... B32B 5/26 |
| EP | 2671707 A1 | 12/2013 | |

OTHER PUBLICATIONS

Wang, Mingji et al., "Substrate Trace Modeling for Package Warpage Simulation", 2016, IEEE 66th Electronic Components and Technology Conference, IEEE. (Year: 2016).*
An, Haichao et al., "Stacking Sequence Optimization and Blending Design of Laminated Composite Structures", Nov. 28, 2018, Structural and Multidisciplinary Optimization, Springer. (Year: 2018).*
Henslehurst, "Fundamentals of Composites Manufacturing: Materials, Methods and Applications, 2nd Edition Chapter 10, Design," 2013, DEStech Publications, 43 pages.
"Chapter 4: Design & Analysis," MIL-HDBK-17-3E, Working Draft, 121 pages.
Extended European Search Report and Written Opinion, dated Dec. 14, 2020, regarding Application No. 20181718.6, 10 pages.

(Continued)

*Primary Examiner* — Cedric Johnson
(74) *Attorney, Agent, or Firm* — Yee & Associates, P.C.

(57) ABSTRACT

A method, apparatus, and system for managing a composite part. An acceptable level of a warpage is identified for the composite part. The warpage for the composite part is a change in the composite part as manufactured that deviates from design specifications for the composite part. Orientations in a stacking sequence for plies in the composite part are selected that result in the composite part having the acceptable level of the warpage and a desired strength to form selected orientations. The composite part is manufactured using the selected orientations.

27 Claims, 13 Drawing Sheets

(56) References Cited

OTHER PUBLICATIONS

Hufenbach et al., "Analysis and optimisation of multistable composites under residual stresses," Composite Structures, 2002, vol. 55, Issue 3, pp. 319-327.
An et al., "Stacking sequence optimization and blending design of laminated composite structures," Structural and Multidisciplinary Optimization, Jan. 2019, vol. 59, 19 pages.
Hsiao et al., "Numerical analysis and optimal design of composite thermoforming process," Computer Methods in Applied Mechanics and Engineering, 1999, vol. 177, Issues 1-2, 34 pages.

* cited by examiner

COMPOSITE STRUCTURE WARPAGE CONTROL SYSTEM

BACKGROUND INFORMATION

1. Field

The present disclosure relates generally to manufacturing and, in particular, to manufacturing composite parts. Still more particularly, the present disclosure relates to a method, apparatus, and system for controlling warpage in manufacturing composite parts.

2. Background

Warpage often occurs in manufacturing of composite parts. With aircraft, composite parts can include, for example, a skin panel, a wing, a stabilizer panel, and other components. For example, these types of composite panels can be reinforced with stiffening structures to reduce or avoid bending or buckling of the structures when loads are applied to these types of structures. Stiffening structures such as stringers can be formed on composite panels or other composite structures. The use of these components to form a stiffened composite part often results in warpage in which the fabricated part has dimensions that deviate from the design specifications for the part. Warpage of composite parts has been relegated as an acceptable manufacturing issue.

With warpage, composite parts may not fit with other composite parts as desired when assembling the parts for the aircraft. As a result, gaps may be present when parts are placed together for assembly.

Shims can be used in these situations. A shim is a structure that is used to align parts. A shim can be, for example, a washer, a wedge, a strip of material, or some other structure that fills a gap between two parts in which the gap occurs from warpage of one or more of the parts.

The use of shims, however, can be time-consuming and increase manufacturing costs. For example, gaps between parts need to be identified and measured. In some cases, warpage may result in gaps that are sufficiently small such that the gaps can be closed when the parts are connected to each other. In these situations, a shim is unnecessary.

When gaps are too large, shims are then fabricated to fit into the gaps. In some cases, the gaps may have a complex shape requiring more time and effort to create shims to fit into the gap. Human operators then install shims to the gaps.

This process is time-consuming and expensive especially when large numbers of shims, such as hundreds or thousands of shims, are installed as part of the aircraft manufacturing process. Additionally, the use of shims can also add weight to the aircraft.

Therefore, it would be desirable to have a method and apparatus that take into account at least some of the issues discussed above, as well as other possible issues. For example, it would be desirable to have a method and apparatus that overcome a technical problem with manufacturing composite parts that have dimensions that deviate from specifications for the composite parts.

SUMMARY

An embodiment of the present disclosure provides a method for managing a composite part. An acceptable level of a warpage is identified for the composite part. The warpage for the composite part is a change in the composite part as manufactured that deviates from design specifications for the composite part. Orientations in a stacking sequence for plies in the composite part are selected to form selected orientations such that manufacturing the composite part using the selected orientations results in the composite part having the acceptable level of the warpage and a desired strength.

Another embodiment of the present disclosure provides a composite part system that comprises a computer system and a composite part designer in the computer system. The composite part designer is configured to identify an acceptable level of a warpage for a composite part. The warpage is a change in the composite part as manufactured that deviates from design specifications for the composite part. The composite part designer selects orientations in a stacking sequence for plies in the composite part to form selected orientations in the stacking sequence such that manufacturing the composite part using the selected orientations in the stacking sequence results in the composite part having the acceptable level of the warpage and a desired strength.

Yet another embodiment of the present disclosure provides a product management system comprising fabrication equipment and a controller in communication with the fabrication equipment. The controller is configured to control the fabrication equipment to manufacture a composite part using a part design that has selected orientations in a stacking sequence for plies in the composite part to form selected orientations in the stacking sequence such that manufacturing the composite part using the selected orientations in the stacking sequence results in the composite part having the acceptable level of the warpage and a desired strength, wherein the warpage is a change in the composite part when manufactured that deviates from design specifications for the composite part.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that, currently, warpage of panels with balanced and symmetric layup is considered to be an inherent behavior of composites and unrelated to laminate in-plane properties. The illustrative embodiments recognize and take into account that, currently, warpage is not considered a defect that can be predicted.

The illustrative embodiments recognize and take into account that current design processes do not use the level of warpage as a variable. The illustrative embodiments recognize and take into account that it would be desirable for current design processes to focus on providing desired performance of composite structures, such as lower wing panels, without regard to warpage that may occur. For example, the illustrative embodiments recognize and take into account that desired performance can be an absence of splitting in the composite parts, such as skin panels on a lower side of an aircraft wing.

Thus, the illustrative examples provide a method, apparatus, and system for designing and manufacturing composite parts that achieve a desired level of warpage and maintain desired performance of the composite parts. For example, an illustrative example manages a composite part. An acceptable level of a warpage is identified for the composite part. The warpage for the composite part is a change in the composite part as manufactured that deviates from design specifications for the composite part. Orientations in a stacking sequence for plies in the composite part are selected to form selected orientations such that manufacturing the composite part using the selected orientations results in the composite part having the acceptable level of the warpage and a desired strength.

Figure 1:
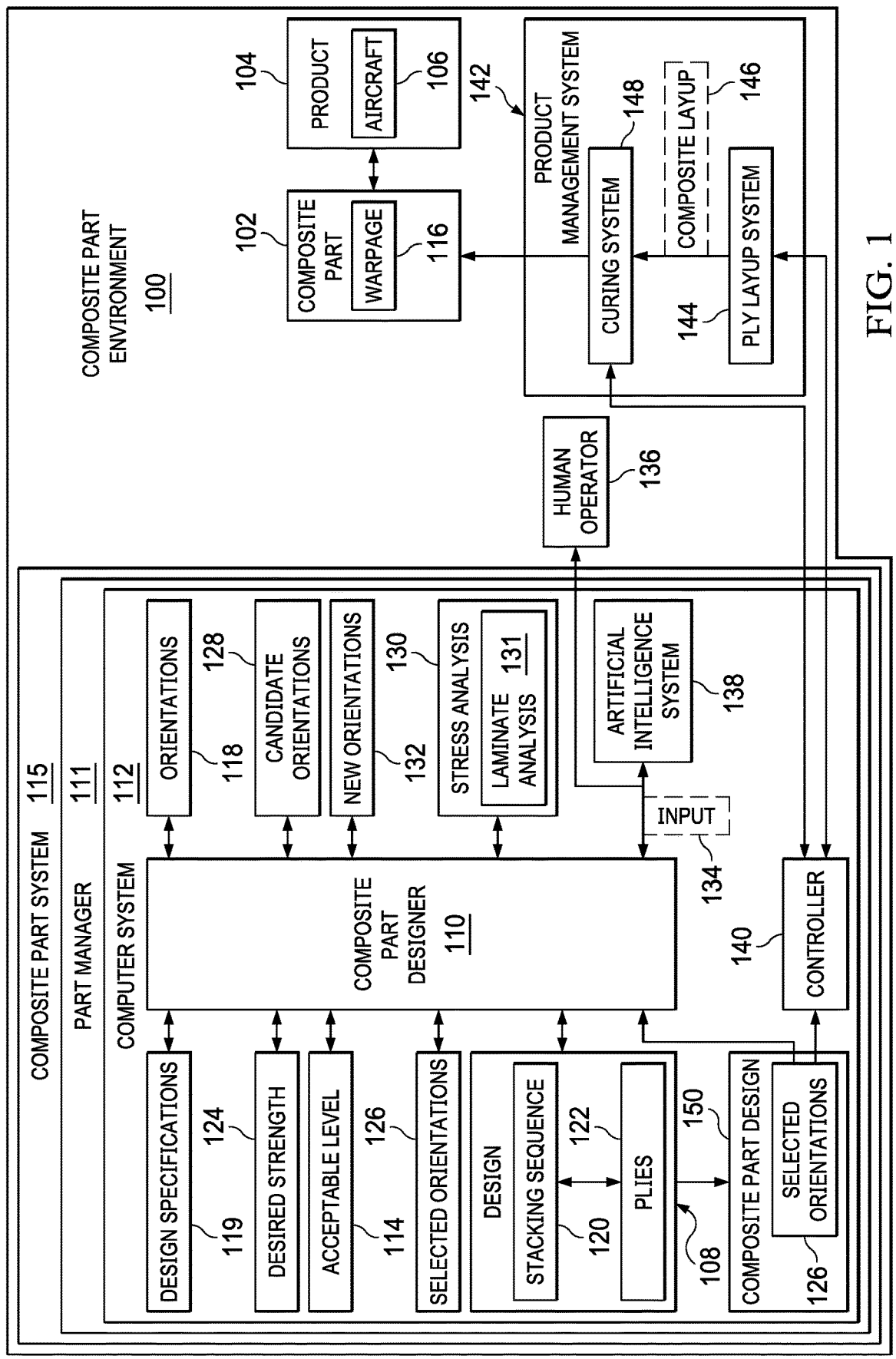
FIG. 1 is an illustration of a composite part environment in accordance with an illustrative embodiment.

With reference to the figures and, in particular, with reference to FIG. 1, an illustration of a composite part environment is depicted in accordance with an illustrative embodiment. Composite part environment 100 is an environment in which composite part 102 is designed for use in product 104 such as aircraft 106. Composite part 102 takes a number of different forms. For example, composite part 102 can be one of a skin panel, a fairing, an engine housing, a stringer, a door, a wing, a panel, and some other suitable type of part that can be used in product 104 and, in particular, aircraft 106.

In this illustrative example, design 108 for composite part 102 is created by composite part designer 110 in part manager 111 in computer system 112. As depicted, composite part designer 110 can be implemented in software, hardware, firmware, or a combination thereof. When software is used, the operations performed by composite part designer 110 can be implemented in program code configured to run on hardware, such as a processor unit. When firmware is used, the operations performed by composite part designer 110 can be implemented in program code and data and stored in persistent memory to run on a processor unit. When hardware is employed, the hardware can include circuits that operate to perform the operations in composite part designer 110.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 112 is a physical hardware system and includes one or more data processing systems. When more than one data processing system is present in computer system 112, those data processing systems are in communication with each other using a communications medium. The communications medium can be a network. The data processing systems can be selected from at least one of a computer, a server computer, a tablet computer, or some other suitable data processing system.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, composite part designer 110 operates to manage composite part 102. The managing of composite part 102 by composite part designer 110 includes identifying acceptable level 114 of warpage 116 for composite part 102.

Warpage 116 for composite part 102 is a change in composite part 102 as manufactured that deviates from design specifications 119 for composite part 102. In the illustrative example, design specifications 119 specify parameters for composite part 102 including at least one of dimensions, strength, tolerances, or other parameters with respect to composite part 102.

In this illustrative example, composite part designer 110 selects orientations 118 in stacking sequence 120 for plies 122 in composite part 102 to form selected orientations 126 in stacking sequence 120. Manufacturing of composite part 102 using selected orientations 126 in stacking sequence 120 results in composite part 102 having acceptable level 114 of warpage 116 and desired strength 124 to form selected orientations 126.

Warpage 116 is treated as a variable by composite part designer 110 in selecting orientations 118. The selection of orientations 118 is made such that composite part 102 has both acceptable level 114 of warpage 116 and desired strength 124. In this illustrative example, desired strength 124 can be based on design specifications 119. The specifications can specify a margin of safety that is desired for composite part 102.

In the illustrative example, composite part designer 110 can select orientations 118 for plies 122 in composite part 102 that result in composite part 102 having acceptable level 114 of warpage 116 and desired strength 124 to form selected orientations 126 in a number of different ways. For example, composite part designer 110 can select candidate orientations 128 in stacking sequence 120 for plies 122. Composite part designer 110 can perform stress analysis 130 on composite part 102 using candidate orientations 128 in stacking sequence 120 for plies 122. As depicted, stress analysis 130 comprises a simulation of one or more types of forces that can be applied to composite part 102. For example, the simulation can be a set of loads applied to composite part 102. Other forces can include a frictional force, a tension force, or other suitable types of forces.

In the illustrative example, stress analysis 130 can take the form of laminate analysis 131. Laminate analysis 131 can be implemented using currently used analysis algorithms that can be used to analyze composite part 102. These algorithms can implement Classical Laminate Plate Theory. In this theory, the engineering and physical properties of a ply are developed based on the fiber angle to the principal loading direction. The properties can be summed in a particular direction with respect to the ply thickness and dividing by the total thickness. Laminate analysis 131 can be run on composite part design 150 to determine parameters such as strength, damage tolerance, or other parameters for composite part 102 manufactured using composite part design 150. Laminate analysis 131 can be used to calculate properties of laminates such as composite part 102 having plies 122 with orientations 118 in stacking sequence 120.

Figure 4:
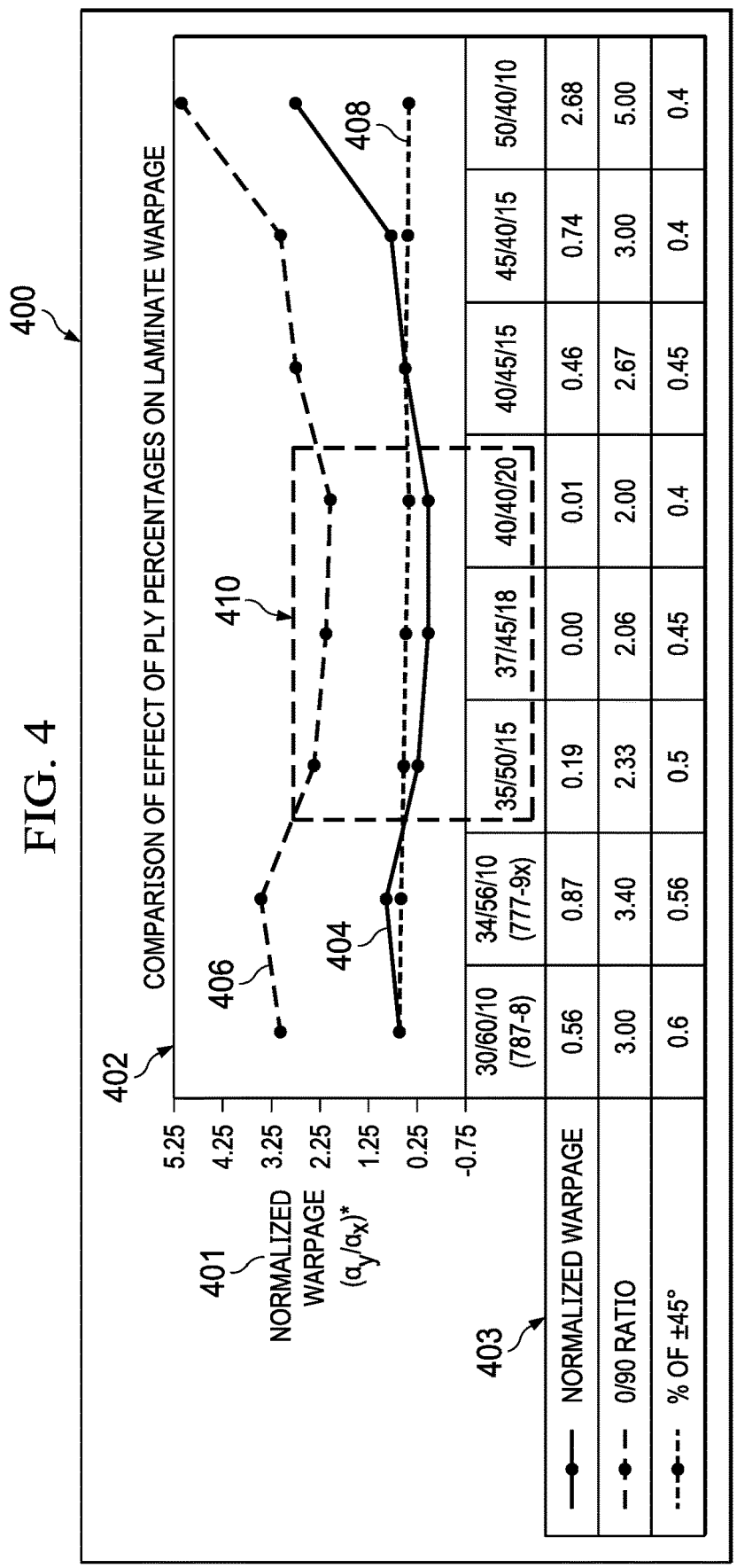
FIG. 4 is an illustration of results displayed in a graphical user interface in accordance with an illustrative embodiment.

In this illustrative example, one of the properties of composite part 102 is the amount or the level of warpage 116. The amount of warpage 116 can be determined by laminate analysis 131 using stacking sequence 120, which includes orientations 118 for plies 122 in addition to other information such as dimensions, type of material, or other information needed to analyze design 108. In the illustrative example, laminate analysis 131 calculates warpage data such as $\alpha_Y$ and $\alpha_X$, and normalized warpage ($\alpha_Y/\alpha_X$) as shown in FIG. 4 and in the description of FIG. 4 below.

Composite part designer 110 uses candidate orientations 128 in stacking sequence 120 as selected orientations 126 when the results from stress analysis 130 indicate that composite part 102 has acceptable level 114 of warpage 116 and desired strength 124 for composite part 102.

Composite part designer 110 can select new orientations 132 in stacking sequence 120 when stress analysis 130, performed on composite part 102 with candidate orientations 128, indicates that composite part 102 fails to have desired strength 124. By changing orientations in stacking sequence 120, the location of plies 122 can be changed in stacking sequence 120 to another location.

Composite part designer 110 performs stress analysis 130 on composite part 102 using new orientations 132 in stacking sequence 120 for plies 122 as candidate orientations 128. Composite part designer 110 repeats selecting new orientations 132 as candidate orientations 128 and performing stress analysis 130 on composite part 102 using candidate orientations 128 in stacking sequence 120 for plies 122 until desired strength 124 is present in composite part 102.

Selected orientations 126 can be comprised of at least one of a 90 degree ply, a +45 degree ply, a −45 degree ply, or a 0 degree ply. For example, selected orientations 126 can be comprised of 90 degree plies, +45 degree plies, −45 degree plies, and 0 degree plies. In another illustrative example, selected orientations 126 can comprise at least 10 percent of the plies having a 90 degree orientation. In another illustrative example, selected orientations 126 can comprise from at least 12.5 percent to 20 percent of the plies having a 90 degree orientation. In still another illustrative example, selected orientations 126 can comprise 40 percent to 50 percent of the plies having a 45 degree orientation. In this example, the 45 degree orientation can be a +45 degree orientation, a −45 degree orientation, or some combination thereof.

In the illustrative example, the degrees for the different orientations can be based on a reference axis. For example, these degrees can be relative to a part axis for composite part 102. In another example, the degrees of plies 122 can be relative to a tool head in a machine such as an automatic tape laying machine or other automated tool.

The illustration of a number of plies for these orientations are only provided as illustrative examples and not meant to limit the manner in which the number of plies in different orientations can be selected. These and other orientations can be used for selected orientations 126 such that acceptable level 114 for warpage 116 is present and desired strength 124 is present for composite part 102. Further, the location of the different orientations that form stacking sequence 120 can be a third variable in addition to acceptable level 114 of warpage 116 and desired strength 124.

In the illustrative example, the selection of at least one of candidate orientations 128 or new orientations 132 can be made by composite part designer 110 in a number of different ways. The selection can be made using input 134 received from at least one of human operator 136 or artificial intelligence system 138.

In this depicted example, human operator 136 is a person who designs composite part 102 for use in aircraft 106. Artificial intelligence system 138 is a system that has intelligent behavior and can be based on the function of a human brain.

As depicted, artificial intelligence system 138 comprises at least one of an artificial neural network, a cognitive system, a Bayesian network, a fuzzy logic, an expert system, a natural language system, or some other suitable system. Machine learning is used to train the artificial intelligence system. Machine learning involves inputting data to the process and allowing the process to adjust and improve the function of the artificial intelligence system.

A cognitive system is a computing system that mimics the function of the human brain. The cognitive system can be, for example, IBM Watson available from International Business Machines Corporation.

In this illustrative example, part manager 111 can also include controller 140 in computer system 112. As depicted, controller 140 is configured to control manufacturing of composite part 102 in product management system 142 using selected orientations 126. In other words, composite part 102 can be manufactured in product management system 142 using selected orientations 126.

With selected orientations 126 in stacking sequence 120, composite part designer 110 can generate composite part design 150. Composite part design 150 is a design that can be used by controller 140 to manufacture composite part 102 such that composite part 102 has acceptable level 114 of warpage 116 and desired strength 124. The design can be, for example, a computer-aided design model, a computer-aided manufacturing model, a computer numerical control (CNC) program, or some other type of model.

In the illustrative example, composite part design 150 is in contrast to design 108. Design 108 contains design specifications 119. Design specifications 119 may include a layup of plies 122 with an initial stacking sequence with orientations for plies 122 in the initial stacking sequence. These orientations can be changed to form selected orientations 126 in stacking sequence 120 that result in acceptable level 114 of warpage 116 and desired strength 124 for composite part 102 that is manufactured using selected orientations 126 in stacking sequence 120.

For example, controller 140 can use composite part design 150 including selected orientations 126 in stacking sequence 120 for plies 122 in composite part 102 to manufacture composite part 102. Controller 140 can control the operation of ply layup system 144 to layup plies 122 for composite part 102 using selected orientations 126 in composite part design 150 to form composite layup 146. In this illustrative example, ply layup system 144 can be, for example, at least one of an automated fiber placement machine, a tape-laying machine, or other suitable hardware equipment that can operate to layup plies 122 with selected orientations 126 in forming composite layup 146.

In the illustrative example, the control of one or more machines in ply layup system 144 can be formed using a program. For example, when an automated fiber placement machine is used, this machine can be a computer numeric control (CNC) automated fiber placement machine. A CNC program can be generated from the design of the parts such as a computer-aided design drawing. This program can be run by controller 140 to control the operation of the automated fiber placement machine. Controller 140 can be a part of the automated fiber placement machine in some illustrative examples.

Additionally, controller 140 can control curing system 148 to cure composite layup 146 to form composite part 102. As depicted, curing system 148 can be at least one of a curing oven, an autoclave, a curing lamp system, or other suitable hardware equipment that can cure composite layup 146 to form composite part 102.

In this illustrative example, part manager 111 is a part of composite part system 115. At least one of ply layup system 144 or curing system 148 can also be part of composite part system 115.

Figure 2:
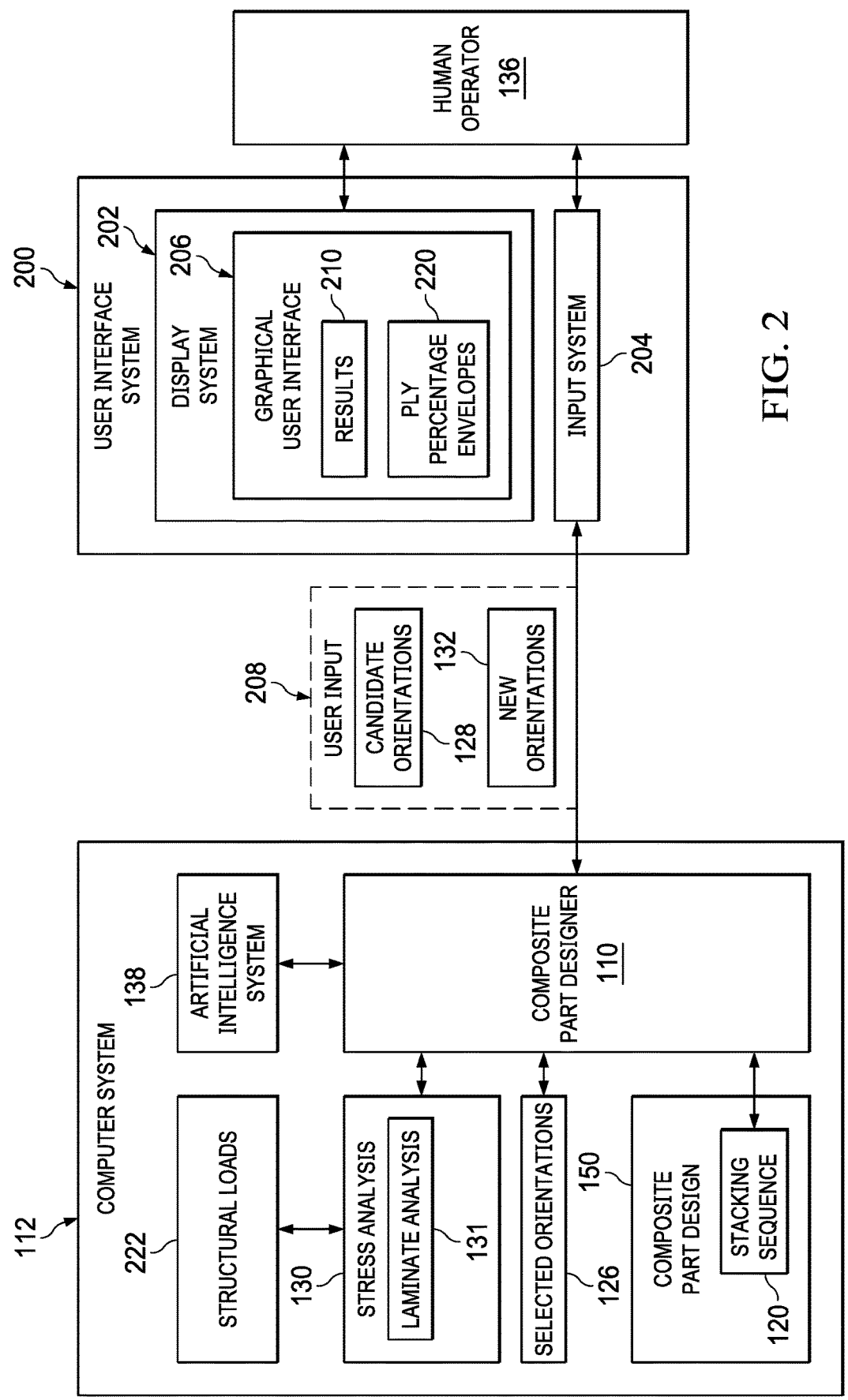
FIG. 2 is an illustration of a block diagram of a user interface system for designing a composite part in accordance with an illustrative embodiment.

With reference next to FIG. 2, an illustration of a block diagram of a user interface system for designing a composite part is depicted in accordance with an illustrative embodiment. In the illustrative examples, the same reference numeral may be used in more than one figure. This reuse of a reference numeral in different figures represents the same element in the different figures.

In this illustrative example, user interface system 200 provides an interface for human operator 136 to interact with at least one of composite part designer 110 or controller 140 in computer system 112 in FIG. 1.

As depicted, user interface system 200 comprises display system 202 and input system 204. These components can be the connected to or considered part of computer system 112.

In this illustrative example, display system 202 is a physical hardware system and includes one or more display devices on which graphical user interface 206 can be displayed. The display devices can include at least one of a light emitting diode (LED) display, a liquid crystal display (LCD), an organic light emitting diode (OLED) display, a computer monitor, a projector, a flat panel display, a heads-up display (HUD), or some other suitable device that can output information for the visual presentation of information.

As depicted, display system 202 is configured to display graphical user interface 206. Human operator 136 is a person that can interact with graphical user interface 206 through user input 208 generated by input system 204 for computer system 112. Input system 204 is a physical hardware system and can be selected from at least one of a mouse, a keyboard, a trackball, a touchscreen, a stylus, a motion sensing input device, a cyber glove, or some other suitable type of input device.

For example, human operator 136 can select or create composite part design 150 for composite part 102 using graphical user interface 206. In this illustrative example, human operator 136 can generate user input 208 to select acceptable level 114 of warpage 116 and desired strength 124 for composite part 102, with the latter three as shown in block form in FIG. 1.

User input 208 can be generated to identify selected orientations 126 in stacking sequence 120 for plies 122 to form composite part design 150. Composite part design 150 is the design that is used by controller 140 to manufacture composite part 102.

As depicted, composite part design 150 includes stacking sequence 120 for plies 122 that form composite part 102. In this illustrative example, stacking sequence 120 can be obtained from design 108 in FIG. 1 for composite part 102.

In this illustrative example, human operator 136 can select candidate orientations 128. As depicted, user input 208 can also select which plies in stacking sequence 120 have particular orientations. In other words, human operator 136 can maintain the same percentages of candidate orientations 128 but change which layers in stacking sequence 120 have particular orientations.

As depicted, sets of candidate orientations 128 can be displayed as ply percentage envelopes 220 on graphical user interface 206. A set of candidate orientations 128 is a ply percentage in this illustrative example. For example, a set of candidate orientations can be 35/50/15 in which 35 is the percentage of plies 122 with 0 degree orientations; 50 is the percentage of plies 122 with +/−45 degree orientations; and 15 is the percentage of plies 122 with 90 degree orientations in stacking sequence 120.

These ply percentage envelopes can be percentages for plies in different orientations. These percentages can be specific values or ranges of plies such as 0 degree plies, +/−45 degree plies, and 90 degree plies. In this illustrative example, +/−45 degree plies are equal percentages of +45 degree plies and −45 degree plies. For example, selecting 30 percent for +/−45 degree plies means 15 percent of the plies are +45 degrees and 15 percent of the plies are −45 degrees.

Selection of a ply percentage envelope in ply percentage envelopes 220 results in a set of candidate orientations 128 for stacking sequence 120 being sent in user input 208 to composite part designer 110.

Composite part designer 110 can perform stress analysis 130 using the set of candidate orientations 128 for stacking sequence 120 to generate results 210. Results 210 can include data or information about at least one of a strength, a margin of safety, warpage, a laminate efficiency, or other information about composite part 102 with candidate orientations 128 in stacking sequence 120 for composite part 102.

Stress analysis 130 is in the form of laminate analysis 131 in this illustrative example. Laminate analysis 131 can receive structural loads 222 for performing analysis on the set of candidate orientations 128 selected by user input 208.

In this illustrative example, results 210 can be displayed in graphical user interface 206 for viewing by human operator 136. Results 210 can be displayed in a number of different ways. For example, results 210 can be displayed using a line graph, a bar graph, text, raw simulation data, or other suitable types of displays.

Further, composite part designer 110 can also display stacking sequence 120 and other suitable information with respect to design 108 of composite part 102. For example, a visualization of composite part 102 with warpage 116 can be displayed, and a visualization of composite part 102 without warpage 116 that follows design 108 can be displayed.

Based on results 210 being displayed in graphical user interface 206, human operator 136 can select new orientations 132 for use as candidate orientations 128 through selection of ply percentage envelopes 220 displayed in graphical user interface 206. Laminate analysis 131 can be performed on the updated candidate orientations. This process can be performed repeatedly until candidate orientations 128 provide desired results for acceptable level 114 of warpage 116 and desired strength 124.

In some illustrative examples, multiple sets of candidate orientations 128 can provide acceptable level 114 of warpage 116 and desired strength 124. In this situation, a set of candidate orientations 128 can be selected based on different factors. These other factors can include at least one of costs, manufacturing difficulty, greatest strength, least amount of warpage, or other suitable factors.

For example, several sets of candidate orientations 128 can provide both acceptable level 114 of warpage 116 and desired strength 124. However, some of the sets of candidate orientations 128 may provide a lower level of warpage 116 even though all of warpage 116 is within acceptable level 114. In other words, acceptable level 114 of warpage 116 can be a threshold for greatest level of warpage 116 that is acceptable.

As another example, some of the sets of candidate orientations 128 may provide a higher level of strength even though all of the sets of candidate orientations 128 provide desired strength 124. In other words, desired strength 124 can be a minimum or threshold level of strength for composite part 102.

Further, results 210 displayed in graphical user interface 206 can also include suggestions for ply percentage envelopes 220 that meet acceptable level 114 of warpage 116 and desired strength 124. These suggestions and results 210 can be generated by at least one of laminate analysis 131 or artificial intelligence system 138. Human operator 136 can generate user input 208 that selects a suggested one of ply percentage envelopes 220. The selection results in the selected ply percentage envelope being used in composite part design 150.

The illustration of ply percentage envelopes 220 in graphical user interface 206 is presented as one manner in which human operator 136 can select candidate orientations 128 from analysis. This illustration is not meant to limit the manner in which candidate orientations 128 can be selected. In still other illustrative examples, human operator 136 can enter candidate orientations 128 for stacking sequence 120 in graphic user interface 206 instead of selecting a ply percentage envelope from ply percentage envelopes 220. In yet another illustrative example, artificial intelligence system 138 can select candidate orientations 128 without needed user input 208 generated by human operator 136.

In one illustrative example, one or more technical solutions are present that overcome a technical problem with manufacturing composite parts that have dimensions that deviate from specifications for the composite parts. In particular, one or more technical solutions are present in an illustrative example that reduce the number of shims that are installed in an object such as an aircraft. As a result, in the illustrative example, one or more technical solutions can provide a technical effect of reducing gaps between composite parts being assembled. In the illustrative example, the number of shims that are manufactured and installed can be reduced with composite parts having fewer gaps that need shims.

Computer system 112 can be configured to perform at least one of the steps, operations, or actions described in the different illustrative examples using software, hardware, firmware, or a combination thereof. As a result, computer system 112 operates as a special purpose computer system in which composite part designer 110 in computer system 112 treats warpage 116 as a variable and enables generating a composite part design that can be used to manufacture a composite part that has acceptable level 114 of warpage 116 and desired strength 124. In particular, composite part designer 110 transforms computer system 112 into a special purpose computer system as compared to currently available general computer systems that do not have composite part designer 110.

In the illustrative example, the use of composite part designer 110 in computer system 112 integrates processes into a practical application for managing composite parts that increase the performance of computer system 112 in controlling the manufacturing of composite parts in a product management system. In other words, composite part design 150 in computer system 112 is directed to a practical application of processes integrated into composite part design 150 in computer system 112 that selects orientations 118 in stacking sequence 120 for plies 122. In this illustrative example, orientations 118 can be selected to form selected orientations 126 in stacking sequence 120. Stacking sequence 120 with selected orientations 126 can perform composite part design 150, which can be used to manufacture composite part 102. Manufacturing composite part 102 using composite part design 150 can result in composite part 102 having desired characteristics such as acceptable level 114 of warpage 116 and desired strength 124.

The illustration of composite part environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Although the illustrative examples are described with respect to aircraft 106, another illustrative example may be applied to other types of platforms. The platform may be, for example, a mobile platform, a stationary platform, a land-based structure, an aquatic-based structure, and a space-based structure. More specifically, the platform may be a surface ship, a tank, a personnel carrier, a train, a spacecraft, a space station, a satellite, a submarine, an automobile, a power plant, a bridge, a dam, a house, a manufacturing facility, a building, and other suitable platforms that use composite parts.

FIGS. 3-6 are examples of one implementation for graphical user interface 206 displayed in display system 202 to human operator 136. Human operator 136 can interact with graphical user interface 206 and generate user input 208 using input system 204 to select candidate orientations 128. Further, these figures also depict different forms that results 210 in FIG. 2 can take when displayed to human operator 136. The display of graphical user interface 206 can be performed by composite part designer 110.

Figure 3:
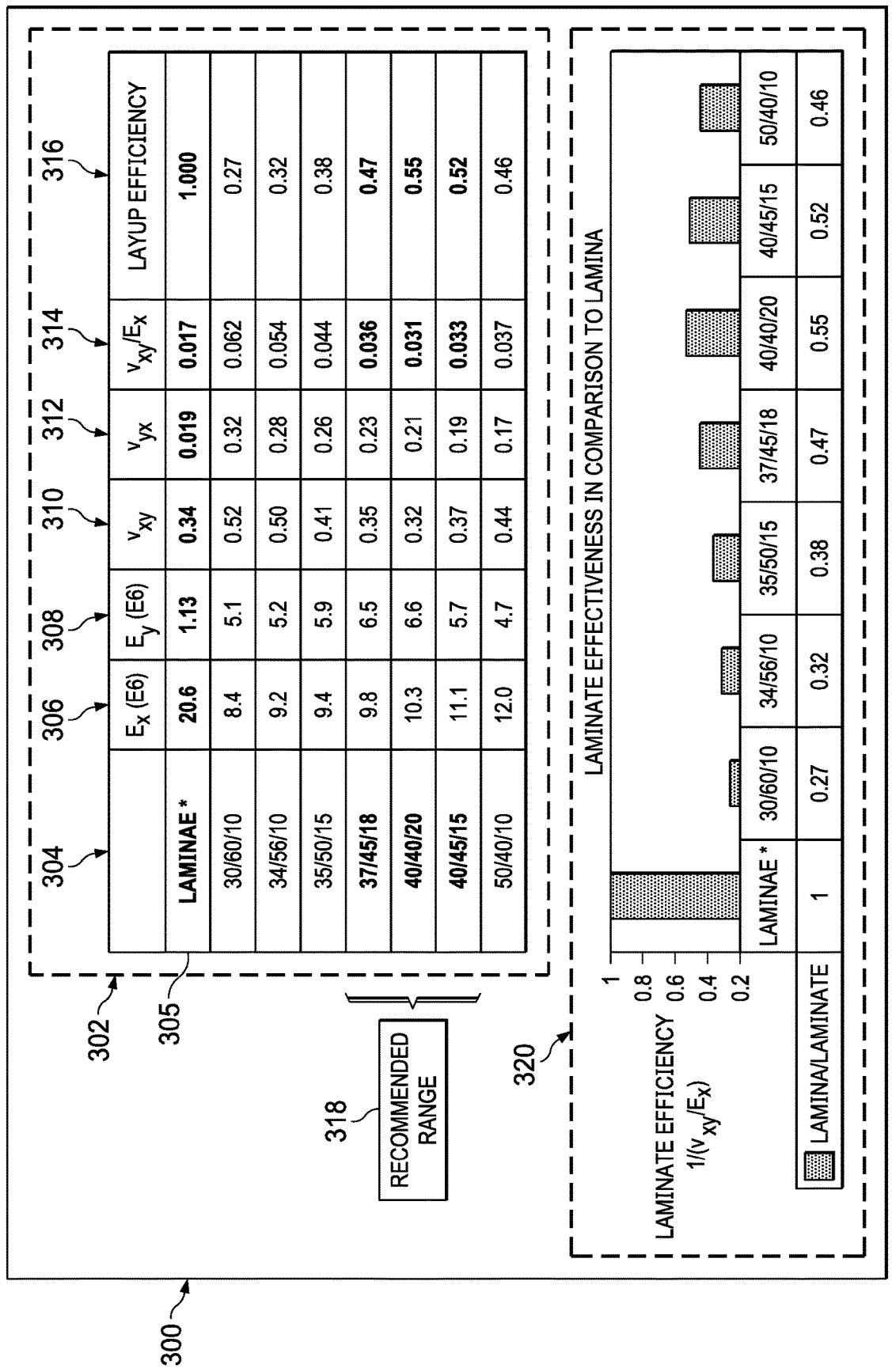
FIG. 3 is an illustration of results displayed in a graphical user interface in accordance with an illustrative embodiment.

With reference first to FIG. 3, an illustration of results displayed in a graphical user interface is depicted in accordance with an illustrative embodiment. In this figure, graphical user interface 300 is an example of one implementation of graphical user interface 206 for displaying results 210 in FIG. 2.

In this example, table 302 illustrates parameters for different ply percentage envelopes. As depicted, column 304 depicts different types of ply percentage envelopes.

In this illustrative example, laminae in column 304 is a composite part comprising layers of plies with all of the same orientation such as 0 degrees. In the other rows, the ply percentage envelopes show percentages for plies having orientations in the following order: 0 degrees, +/−45 degrees, and 90 degrees. In this illustrative example, "+/−" degrees means that the percentage for the 45 degree plies is distributed evenly between −45 degrees and +45 degrees.

As depicted, column 306 contains values for elastic modulus in the x direction, and column 308 contains values for elastic modulus in the y direction. Column 310 contains values for Poisson's ratio in which $V_{xy}$ denotes straining of the laminate having a plane XY in the y direction caused by loading in the X direction. As depicted in column 312, $V_{yx}$ is Poisson's ratio with straining in the X direction caused loading in the Y direction on the XY plane.

In table 302, column 314 includes values for Poisson's ratio divided by elastic modulus in the x direction. The values in this column are derived from generalized Hooke's law, the governing law for orthotropic materials, including composite materials, in conjunction with application of Betti's law. This information signifies that elastic properties control the strength contribution of a given lamina of a given orientation within the context of the laminate, independent of shear modulus, Gxy.

Column 316 includes values for layup efficiency. As can be seen, laminae in row 305 has the best efficiency. The efficiency takes into account factors such as warpage, ply orientation, percentage of plies, and other factors.

In this illustrative example, graphical indicator 318 identifies recommended percentage ply envelopes. In this example, the recommended ply percentage envelope is indicated by graphical indicator 318 which comprises 37/45/18; 40/40/20; and 40/45/15.

Bar graph 320 shows laminate effectiveness for composite parts with different ply percentage envelopes as compared to laminae. Bar graph 320 graphically depicts the values in column 316 in graphical user interface 300.

Turning to FIG. 4, an illustration of results displayed in a graphical user interface is depicted in accordance with an illustrative embodiment. In this figure, graphical user interface 400 is an example of one implementation of graphical user interface 206 for displaying results 210 in FIG. 2.

In this example, line graph 402 illustrates a comparison of the effects of ply percentages on warpage for a composite part such as a panel. As depicted, x-axis 403 depicts ply percentage envelopes, and y-axis 401 depicts normalized warpage. Normalized warpage is warpage that has been normalized with respect to one of the ply percentage envelopes such that the ply percentage envelopes can be compared to each other. In this illustrative example, ply percentage envelope 37/45/18 is selected because the ply percentage envelope is the layup for a composite part having the lowest warpage.

In this illustrative example, line 404 is normalized warpage. Line 406 is a ratio of 0 degree plies and 90 degree plies, and line 408 represents a percentage of +/−45 degree plies in the different ply percentage envelopes. Line 406 depicts the effect of +/−45 plies on warpage in the composite part.

Graphical indicator 410 identifies an efficient layup range. This range encompasses the following ply percentage envelopes: 35/50/15; 37/45/18; and 40/40/20. With these ply percentage envelopes, the percentages are in the following order: 0 degree plies; +/−45 degree plies; and 90 degree plies.

As depicted, graphical indicator 410 displayed on graphical user interface 400 indicates the ply percentage envelopes that are suitable or recommended.

Figure 5:
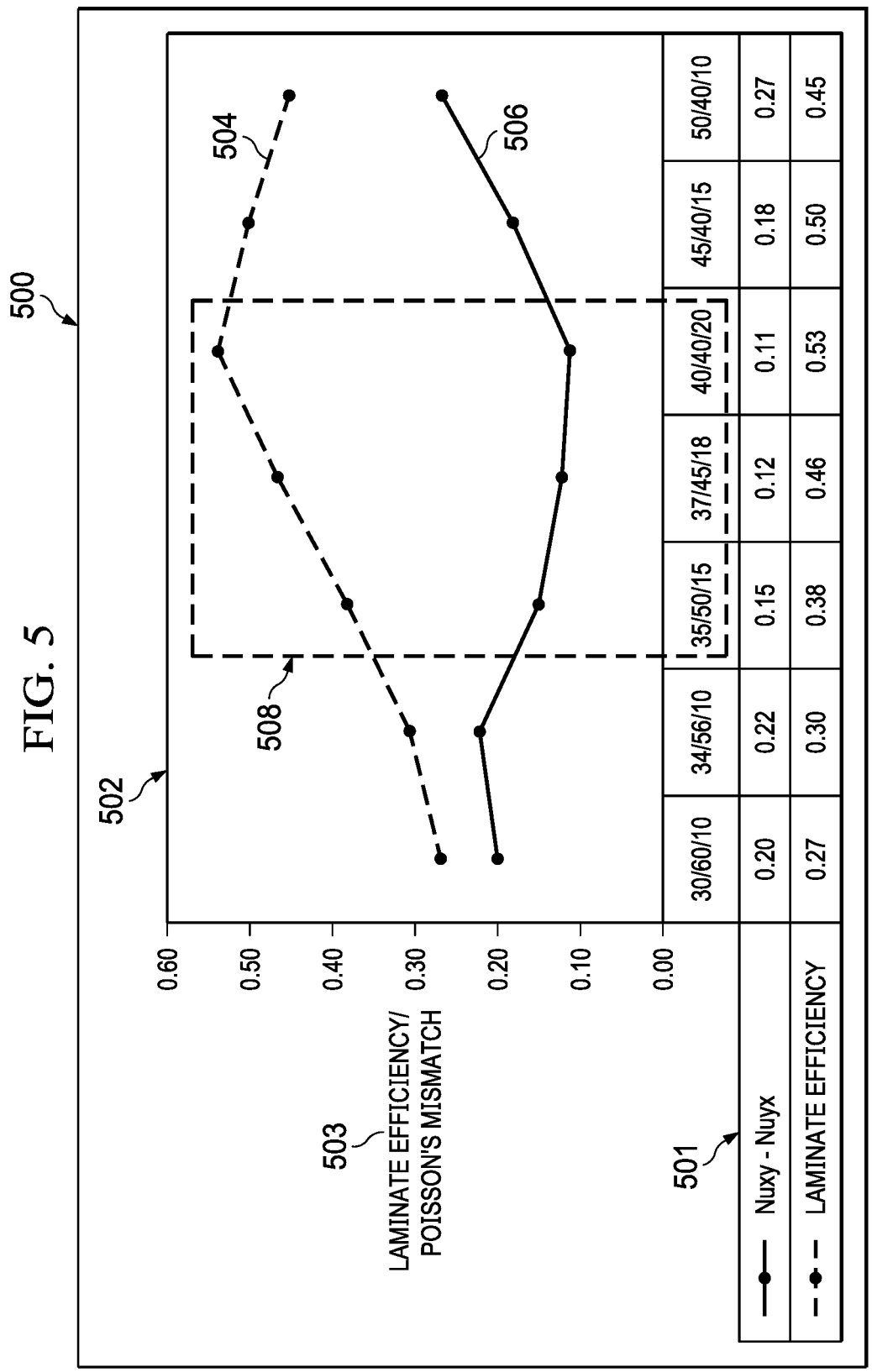
FIG. 5 is an illustration of results displayed in a graphical user interface in accordance with an illustrative embodiment.

In FIG. 5, an illustration of results displayed in a graphical user interface is depicted in accordance with an illustrative embodiment. In this figure, graphical user interface 500 is an example of one implementation of graphical user interface 206 for displaying results 210 in FIG. 2.

As depicted, line graph 502 shows laminate efficiency versus Poisson's mismatch ratios. In this example, x-axis 501 represents ply percentage envelopes, and y-axis 503 represents laminate efficiency to Poisson's mismatch ratios.

In this illustrative example, line 504 in line graph 502 illustrates laminate efficiency for a composite part using the different ply percentage envelopes. Laminate efficiency shows the efficiency of a composite part manufactured using a particular ply percentage envelope. In this illustrative example, the greatest efficiency is considered to be plies having a 0 degree orientation. This type of composite part has a managed efficiency of 1.0.

Line 506 in line graph 502 depicts a Poisson's ratio mismatch for the different ply percentage envelopes. As can be seen in line graph 502, a direct correlation between laminate efficiency and a Poisson's ratio mismatch is present. A lower Poisson's ratio mismatch results in a higher laminate efficiency. For example, it is desirable to have a Poisson's ratio of individual plies of 0.34. This value is selected as one such that the plies are not overextended to reduce the possibility of a premature delamination or despond. A Poisson's ratio that is less 0.34 can reduce or eliminate issues such as delamination or disbonding. As the Poisson's ratio reduces, the mechanical residual stresses in the composite part are reduced.

In this illustrative example, graphical indicator 508 identifies recommended percentage envelopes for use in the composite part. In this illustrative example, graphical indicator 508 recommends the following ply percentage envelopes: 35/50/15; 37/45/18; and 40/40/20. With these ply percentage envelopes, the percentages are in the following order: 0 degree plies; +/−45 degree plies; and 90 degree plies.

Figure 6:
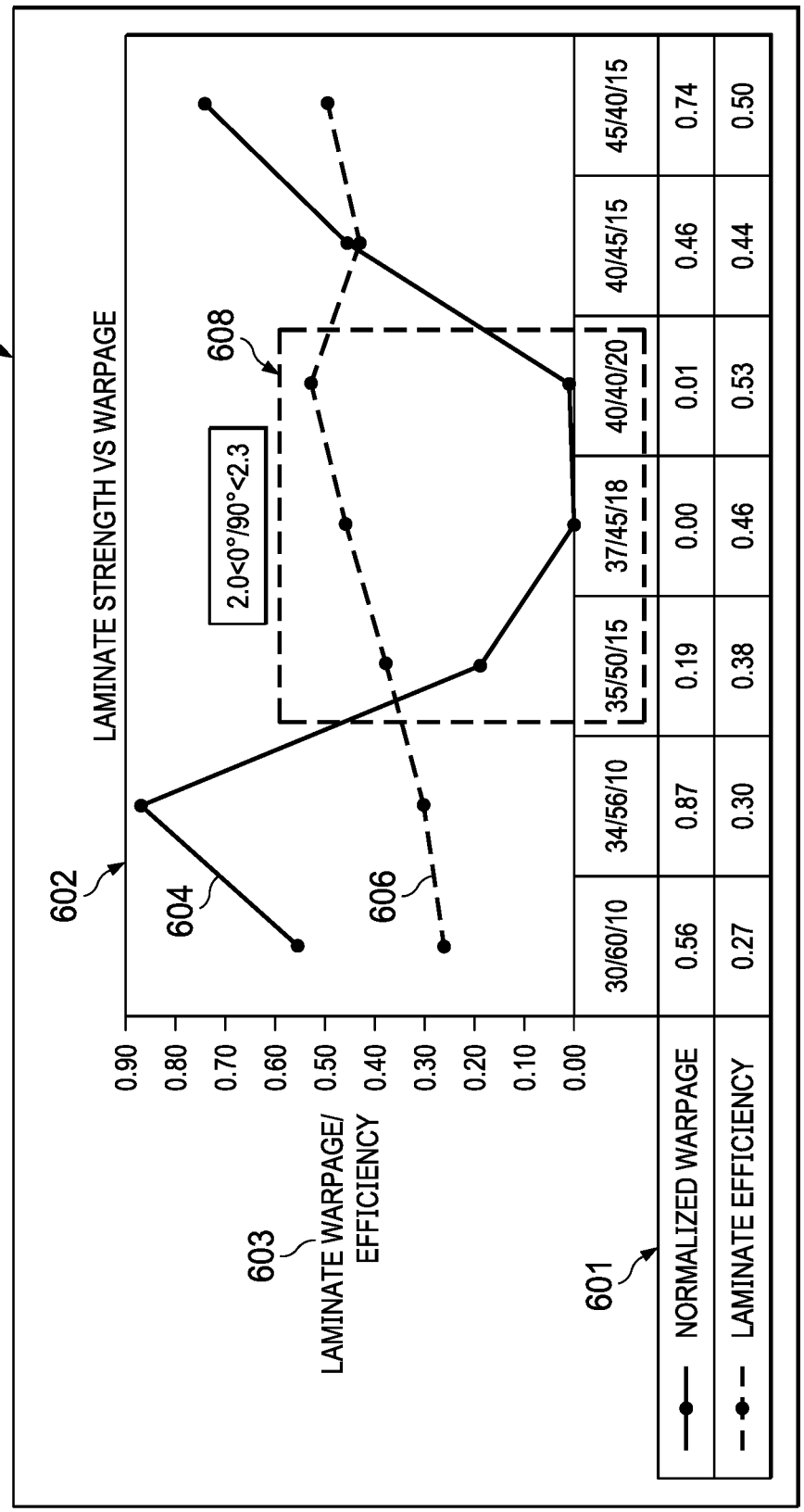
FIG. 6 is an illustration of results displayed in a graphical user interface in accordance with an illustrative embodiment.

With reference now to FIG. 6, an illustration of results displayed in a graphical user interface is depicted in accordance with an illustrative embodiment. In this figure, graphical user interface 600 is an example of one implementation of graphical user interface 206 for displaying results 210 in FIG. 2.

As depicted, line graph 602 shows laminate strength versus warpage. In this example, x-axis 601 represents ply percentage envelopes, and y-axis 603 represents the ratio of warpage to laminate efficiency.

In line graph 602, line 604 represents normalized warpage. Warpage can be normalized using a ply percentage envelope having the lowest amount of warpage.

Line 606 represents laminate efficiency. In this example, a composite part having plies with a 0 degree orientation has a deficiency of 1.0 because the load is placed along the ply. Other plies such as +/−45 degrees and 90 degrees have a lower level of efficiency as compared to 0 degree plies.

As depicted, graphical indicator 608 identifies ply percentage envelopes that are recommended for use. In this illustrative example, graphical indicator 608 identifies the following ply percentage envelopes: 35/50/15; 37/45/18; and 40/40/20. With these ply percentage envelopes, the percentages are in the following order: 0 degree plies; +/−45 degree plies; and 90 degree plies.

The illustrations of a graphical user interface in FIGS. 3-6 have been provided for purposes of examples of how graphical user interface 206 shown in block form in FIG. 2 can be implemented. For example, other types of graphical displays can use other types of charts. For example, a scatter chart, a waterfall chart, an area chart, or other types of graphs or charts can be used in addition to or in place of those depicted in these figures. As another example, graphical indicators can include at least one of an animation, text, an icon, an image, or other suitable types of graphical indicators that can draw the attention of the human operator to a particular ply percentage or other information displayed in a graphical user interface.

Further, other percentages of plies can be used in addition to or in place of the ones illustrated. Further, although the orientations are depicted as 0 degrees, +45 degrees, −45 degrees, and 90 degrees, other orientations can be used in addition to or in place of the ones depicted, such as, for example, 30 degrees, 60 degrees, or some other suitable orientations. Some ply percentage envelopes may include only two orientations rather than three sections as shown in the illustrative examples.

Figure 7:
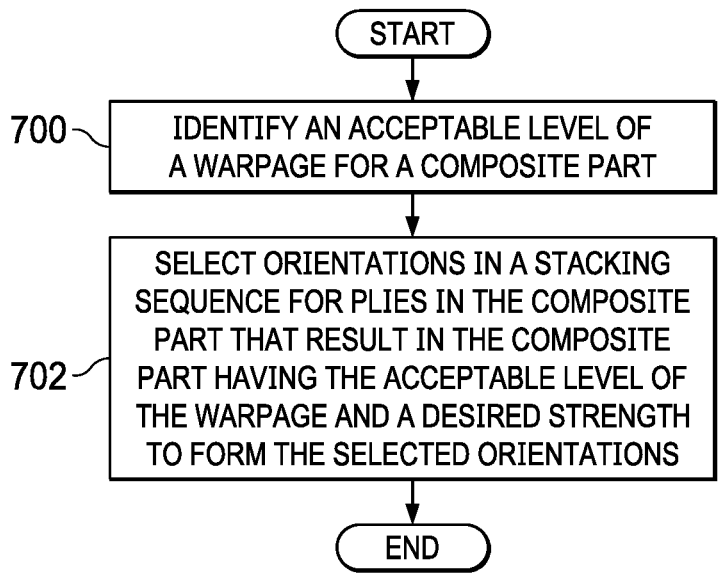
FIG. 7 is an illustration of a flowchart of a process for managing a composite part in accordance with an illustrative embodiment.

Turning next to FIG. 7, an illustration of a flowchart of a process for managing a composite part is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in part manager 111 in computer system 112 in FIG. 1. The managing of a composite part includes at least one of designing the composite part, manufacturing the composite part, or both designing and manufacturing the composite part.

The process begins by identifying an acceptable level of warpage for a composite part (operation 700). The warpage for the composite part is a change in the composite part as manufactured that deviates from design specifications for the composite part. In this example, warpage is a variable that can be selected in determining the orientations for the plies.

The process selects orientations in a stacking sequence for plies in the composite part that result in the composite part having the acceptable level of the warpage and a desired strength to form the selected orientations (operation 702). The process terminates thereafter. The composite part can be manufactured using the selected orientations.

Figure 8:
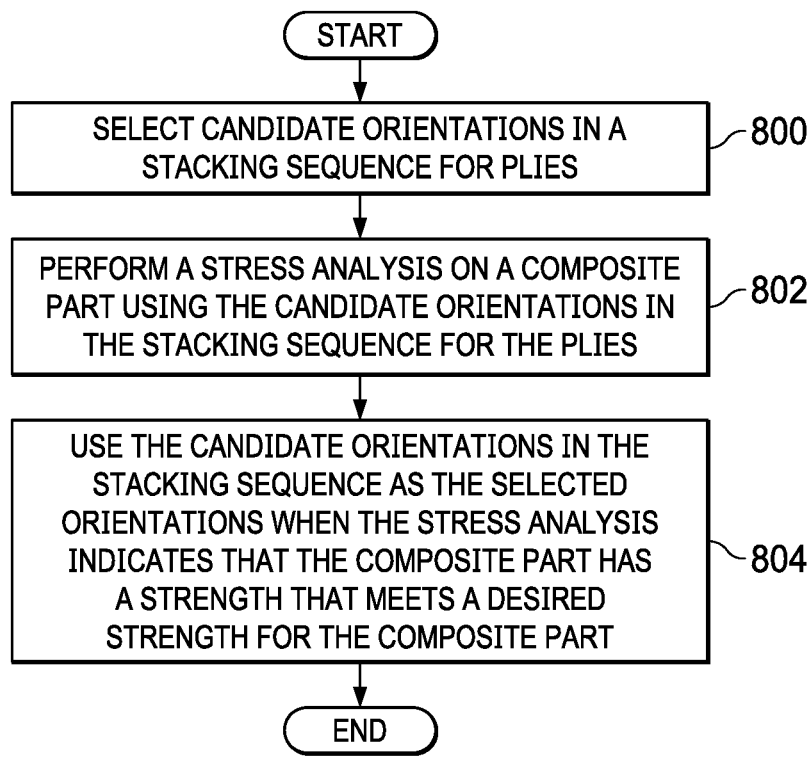
FIG. 8 is an illustration of flowchart of a process for selecting orientations for plies in a composite part in accordance with an illustrative embodiment.

With reference next to FIG. 8, an illustration of a flowchart of a process for selecting orientations for plies in a composite part is depicted in accordance with an illustrative embodiment. The process in FIG. 8 is an example of one manner in which operation 702 in FIG. 7 can be implemented.

The process begins by selecting candidate orientations in a stacking sequence for plies (operation 800). The process performs a stress analysis on a composite part using the candidate orientations in the stacking sequence for the plies (operation 802). The process uses the candidate orientations in the stacking sequence as the selected orientations when the stress analysis indicates that the composite part has a strength that meets the desired strength for the composite part (operation 804). The process terminates thereafter.

Figure 9:
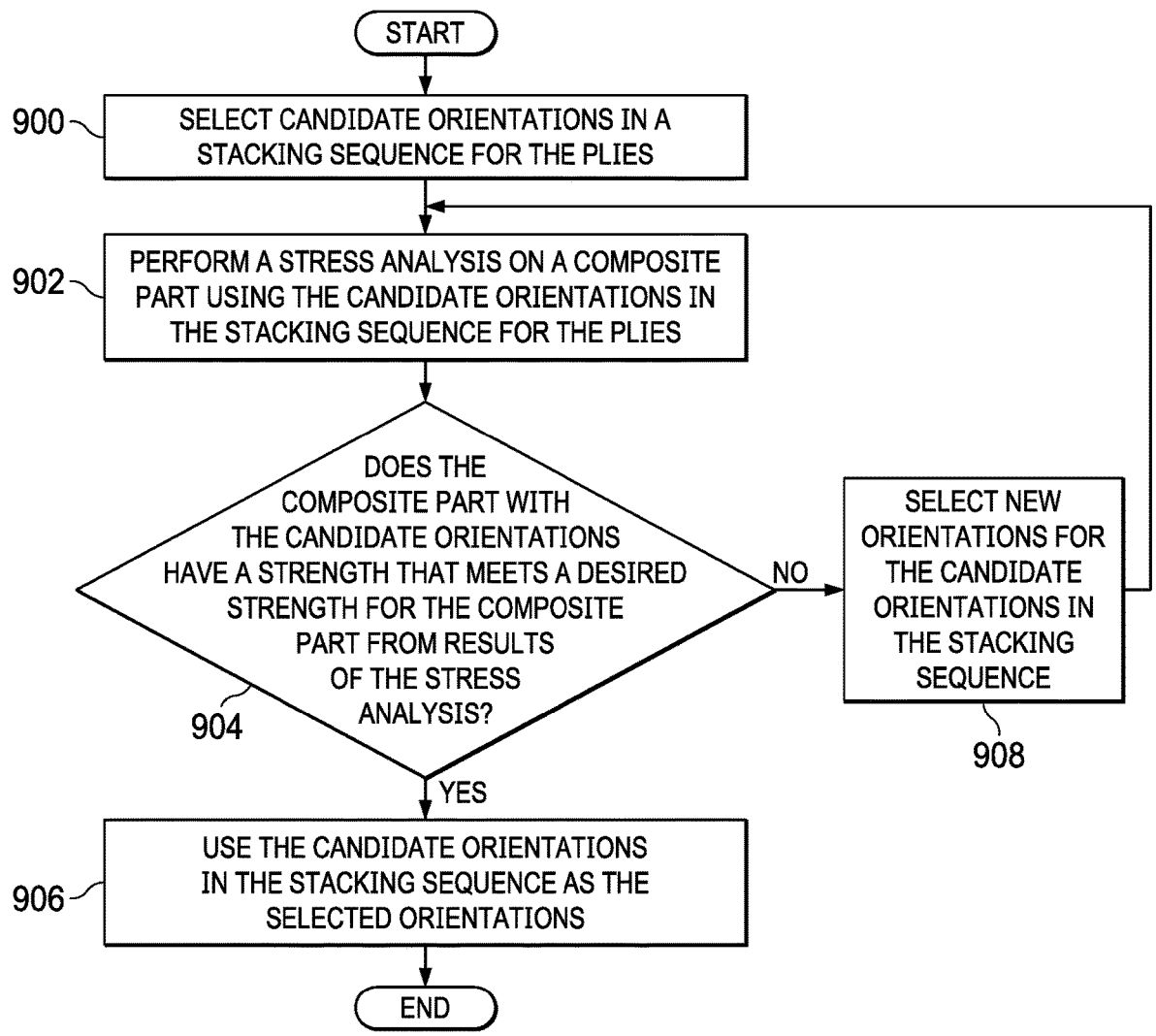
FIG. 9 is an illustration of a flowchart of a process for selecting orientations for plies in a composite part in accordance with an illustrative embodiment.

With reference next to FIG. 9, an illustration of a flowchart of a process for selecting orientations for plies in a composite part is depicted in accordance with an illustrative embodiment. The process in FIG. 9 is an example of one manner in which operation 702 in FIG. 7 can be implemented.

The process begins by selecting candidate orientations in a stacking sequence for plies (operation 900). Operation 900 can be performed by receiving user input selecting the candidate orientations. For example, the user input made to a graphical user interface selecting sets of candidate orientations displayed on the graphical user interface can be received. The sets of candidate orientations can be ply percentage envelopes. Each ply percentage envelope is a set of candidate orientations.

The process performs a stress analysis on a composite part using the candidate orientations in the stacking sequence for the plies (operation 902). The process determines whether the composite part with the candidate orientations has a strength that meets the desired strength for the composite part from the results of the stress analysis (operation 904).

If the stress analysis indicates that the composite part with the candidate orientations has a strength that meets the desired strength for the composite part, the process uses the candidate orientations in the stacking sequence as the selected orientations (operation 906). The process terminates thereafter.

With reference again to operation 904, if the stress analysis indicates that the composite part with the candidate orientations has a strength that does not meet the desired strength for the composite part, the process then selects new orientations for the candidate orientations in the stacking sequence (operation 908). The process returns to operation 902 to perform the stress analysis on the composite part using the candidate orientations in the stacking sequence for the plies.

Figure 10:
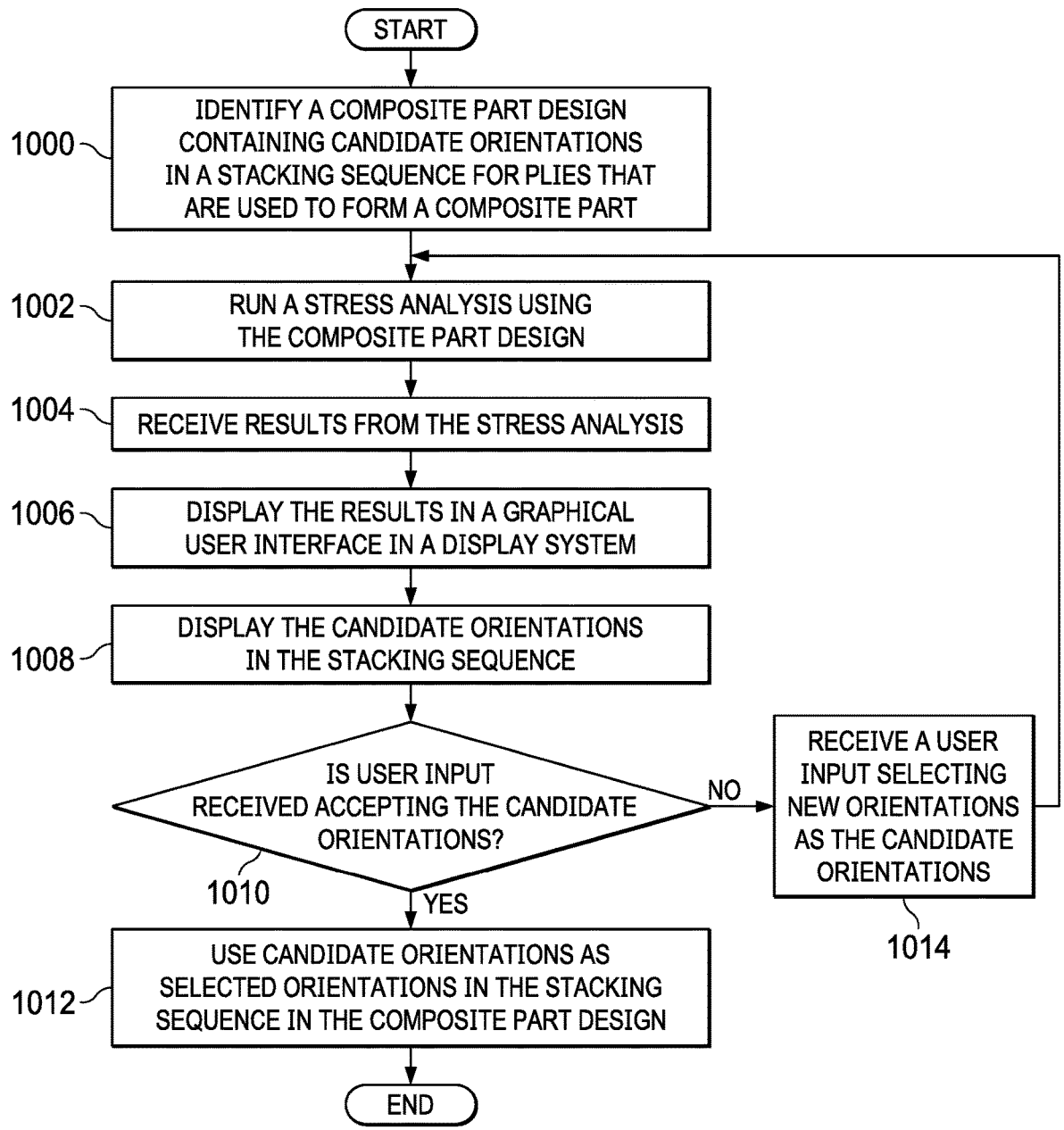
FIG. 10 is an illustration of a flowchart of a process for displaying results from analyzing orientations for plies in accordance with an illustrative embodiment.

Turning to FIG. 10, an illustration of a flowchart of a process for displaying results from analyzing orientations for plies is depicted in accordance with an illustrative embodiment. The process in FIG. 11 can be implemented in hardware, software, or both. When implemented in software, the process can take the form of program code that is run by one of more processor units located in one or more hardware devices in one or more computer systems.

For example, the process can be implemented in part manager 111 in computer system 112 in FIG. 1. More specifically, the process can be implemented in composite part designer 110 to display results 210 in graphical user interface 206 on display system 202 in FIG. 2.

The process begins by identifying a composite part design containing candidate orientations in a stacking sequence for plies that are used to form a composite part (operation 1000). The process runs a stress analysis using the composite part design (operation 1002).

The process receives results from the stress analysis (operation 1004). In this illustrative example, the results can include information selected from at least one of a level of warpage, a strength, a ratio of orientations, a percentage of orientations, sets of candidate orientations, or a graphical indicator identifying a best set of candidate orientations or a range of sets of candidate orientations.

The process displays the results in a graphical user interface in a display system (operation 1006). The process also displays the candidate orientations in the stacking sequence (operation 1008).

A determination is made as to whether user input is received accepting the candidate orientations (operation 1010). If the user input is received to accept the candidate orientations, the candidate orientations are used as selected orientations in the stacking sequence in the composite part design (operation 1012). The process terminates thereafter.

With reference again to operation 1010, if the user input is not received to accept the candidate orientations, the process receives the user input selecting new orientations as the candidate orientations (operation 1014). The process then returns to operation 1002.

Figure 11:
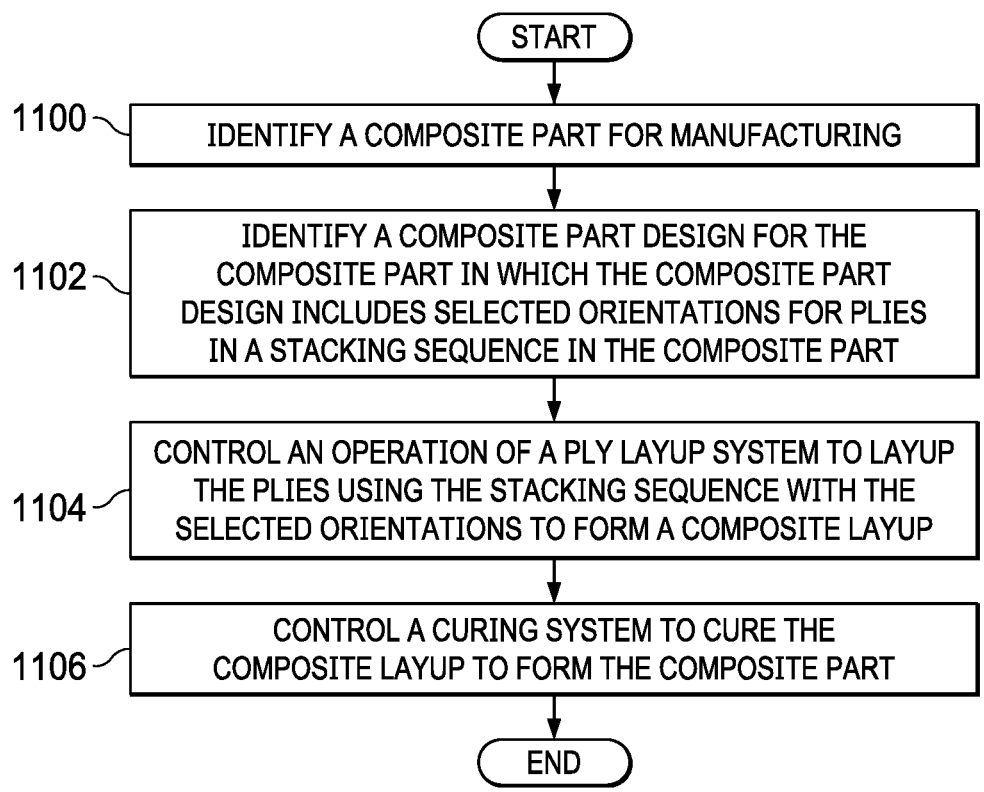
FIG. 11 is an illustration of a flowchart of a process for manufacturing a composite part in accordance with an illustrative embodiment.

Turning to FIG. 11, an illustration of a flowchart of a process for manufacturing a composite part is depicted in accordance with an illustrative embodiment. The process in FIG. 11 can be implemented in hardware, software, or both. When implemented in software, the process can take the form of program code that is run by one or more processor units located in one or more hardware devices in one or more computer systems. For example, the process can be implemented in part manager 111 in computer system 112 in FIG. 1. The managing of a composite part includes at least one of designing the composite part, manufacturing the composite part, or both designing and manufacturing the composite part.

The process begins by identifying a composite part for manufacturing (operation 1100). The process identifies a composite part design for the composite part in which the composite part design includes selected orientations for plies in a stacking sequence in the composite part (operation 1102). In this illustrative example, the selected orientations are selected such that the composite part manufactured will have an acceptable level of warpage and a desired strength.

The process controls an operation of a ply layup system to layup the plies using the stacking sequence with the selected orientations to form a composite layup (operation 1104). This composite layup is an uncured form of the composite part. The process controls a curing system to cure the composite layup to form the composite part (operation 1106). The process terminates thereafter.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 12:
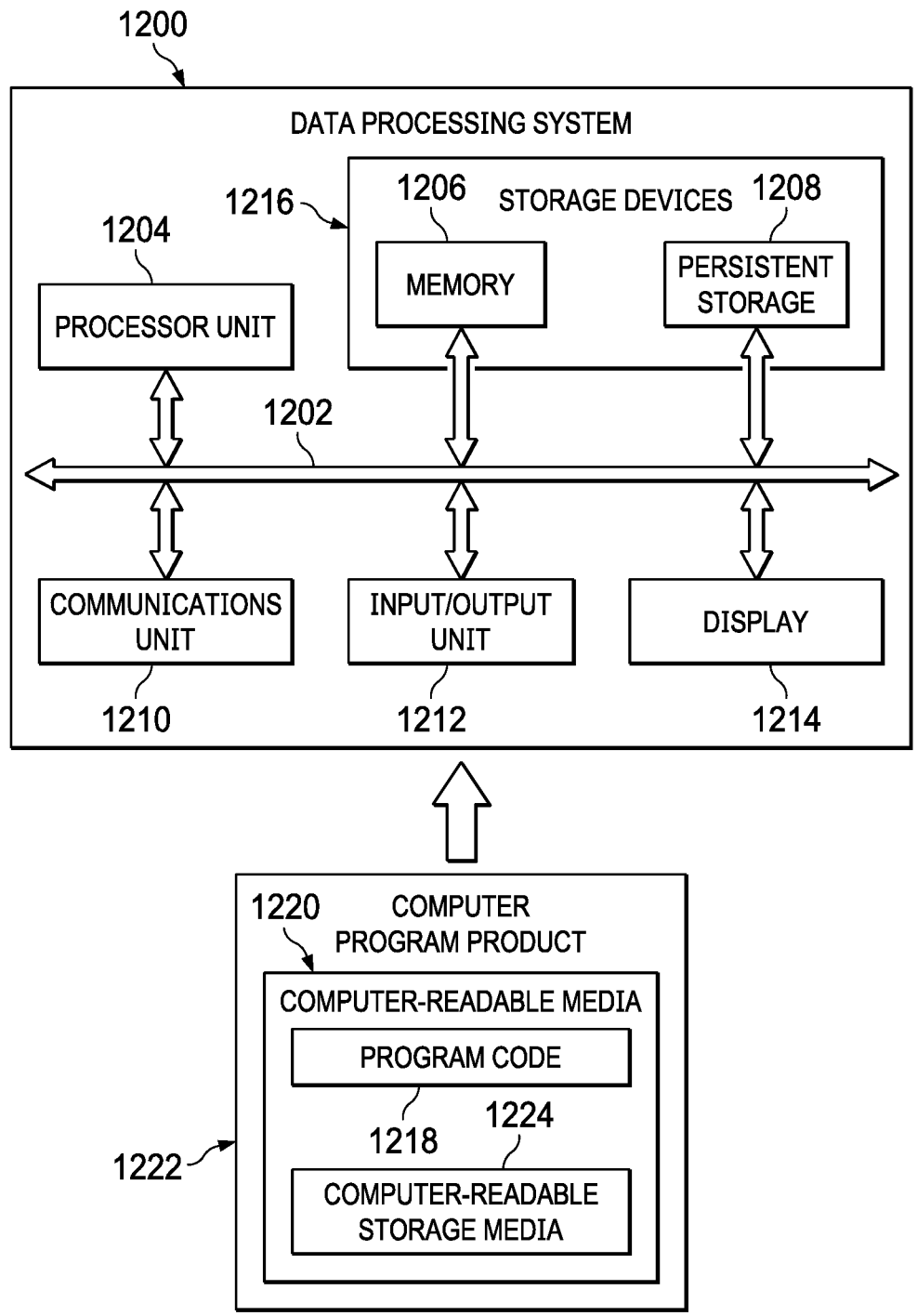
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 can be used to implement one or more data processing systems in computer system 112 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that can be loaded into memory 1206. Processor unit 1204 includes one or more processors. For example, processor unit 1204 can be selected from at least one of a multicore processor, a central processing unit (CPU), a graphics processing unit (GPU), a physics processing unit (PPU), a digital signal processor (DSP), a network processor, or some other suitable type of processor.

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, can be, for example, a random-access memory or any other suitable volatile or non-volatile storage device. Persistent storage 1208 can take various forms, depending on the particular implementation.

For example, persistent storage 1208 may contain one or more components or devices. For example, persistent storage 1208 can be a hard drive, a solid-state drive (SSD), a flash memory, a rewritable optical disk, a rewritable magnetic tape, or some combination of the above. The media used by persistent storage 1208 also can be removable. For example, a removable hard drive can be used for persistent storage 1208.

Communications unit 1210, in these illustrative examples, provides for communications with other data processing systems or devices. In these illustrative examples, communications unit 1210 is a network interface card.

Input/output unit 1212 allows for input and output of data with other devices that can be connected to data processing system 1200. For example, input/output unit 1212 can provide a connection for user input through at least one of a keyboard, a mouse, or some other suitable input device. Further, input/output unit 1212 can send output to a printer. Display 1214 provides a mechanism to display information to a user.

Instructions for at least one of the operating system, applications, or programs can be located in storage devices 1216, which are in communication with processor unit 1204 through communications framework 1202. The processes of the different embodiments can be performed by processor unit 1204 using computer-implemented instructions, which can be located in a memory, such as memory 1206.

These instructions are referred to as program code, computer usable program code, or computer-readable program code that can be read and executed by a processor in processor unit 1204. The program code in the different embodiments can be embodied on different physical or computer-readable storage media, such as memory 1206 or persistent storage 1208.

Program code 1218 is located in a functional form on computer-readable media 1220 that is selectively removable and can be loaded onto or transferred to data processing system 1200 for execution by processor unit 1204. Program code 1218 and computer-readable media 1220 form computer program product 1222 in these illustrative examples. In the illustrative example, computer-readable media 1220 is computer-readable storage media 1224.

In these illustrative examples, computer-readable storage media 1224 is a physical or tangible storage device used to store program code 1218 rather than a medium that propagates or transmits program code 1218.

Alternatively, program code 1218 can be transferred to data processing system 1200 using a computer-readable signal media. The computer-readable signal media can be, for example, a propagated data signal containing program code 1218. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

The different components illustrated for data processing system 1200 are not meant to provide architectural limitations to the manner in which different embodiments can be implemented. In some illustrative examples, one or more of the components may be incorporated in or otherwise form a portion of, another component. For example, memory 1206, or portions thereof, can be incorporated in processor unit 1204 in some illustrative examples. The different illustrative embodiments can be implemented in a data processing system including components in addition to or in place of those illustrated for data processing system 1200. Other components shown in FIG. 12 can be varied from the illustrative examples shown. The different embodiments can be implemented using any hardware device or system capable of running program code 1218.

Figure 13:
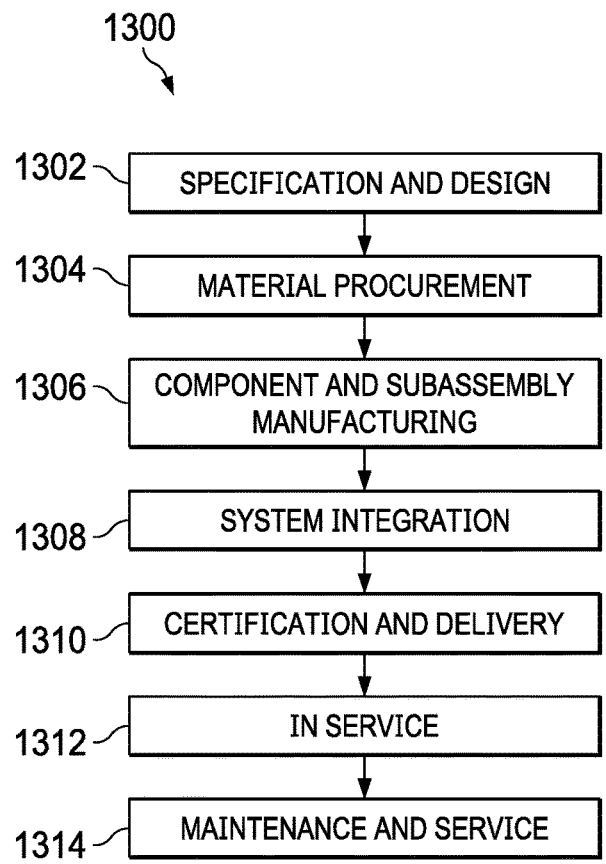
FIG. 13 is an illustration of an aircraft manufacturing and service method in accordance with an illustrative embodiment.
Figure 14:
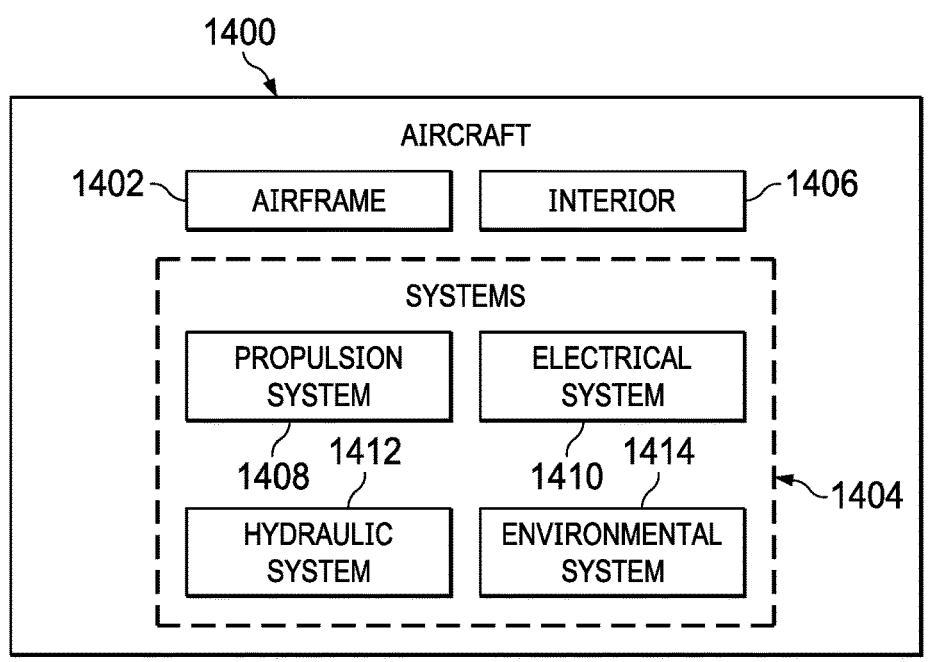
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13.

In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

For example, the use of composite parts manufactured in accordance with an illustrative example can reduce the number of shims needed to assemble aircraft 1400. As result, the amount of time and expense needed in at least one component and subassembly manufacturing 1306 or system integration 1308 can be reduced because of a reduction in the need to manufacture and install shims as part of assembly components to form aircraft 1400.

A similar reduction in time expense can occur during maintenance and service 1314 by reducing the number of shims that need to be fabricated and installed replacing parts for adding parts during at least one of routine maintenance, refurbishment, reconfiguration, modification, or other maintenance.

Figure 15:
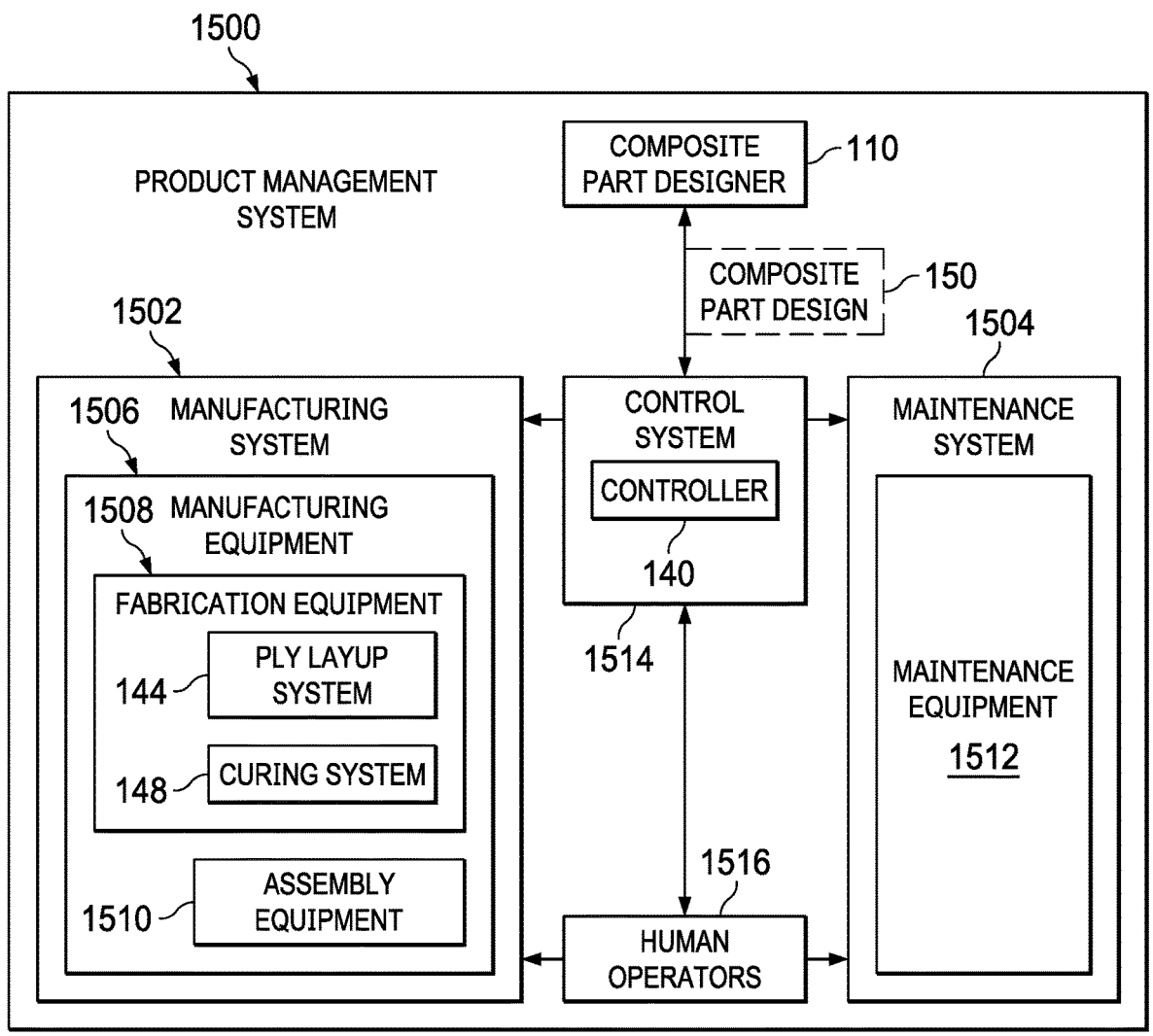
FIG. 15 is an illustration of a block diagram of a product management system is depicted in accordance with an illustrative embodiment.

Turning now to FIG. 15, an illustration of a block diagram of a product management system is depicted in accordance with an illustrative embodiment. Product management system 1500 is a physical hardware system. In this illustrative example, product management system 1500 includes at least one of manufacturing system 1502 or maintenance system 1504.

Manufacturing system 1502 is configured to manufacture products, such as aircraft 1400 in FIG. 14. As depicted, manufacturing system 1502 includes manufacturing equipment 1506. Manufacturing equipment 1506 includes at least one of fabrication equipment 1508 or assembly equipment 1510.

Fabrication equipment 1508 is equipment that used to fabricate components for parts used to form aircraft 1400 in FIG. 14. For example, fabrication equipment 1508 can include machines and tools. These machines and tools can be at least one of a drill, a hydraulic press, a furnace, a mold, a composite tape laying machine, a vacuum system, a lathe, or other suitable types of equipment. Fabrication equipment 1508 can be used to fabricate at least one of metal parts, composite parts, semiconductors, circuits, fasteners, ribs, skin panels, spars, antennas, or other suitable types of parts.

Assembly equipment 1510 is equipment used to assemble parts to form aircraft 1400 in FIG. 14. In particular, assembly equipment 1510 is used to assemble components and parts to form aircraft 1400 in FIG. 14. Assembly equipment 1510 also can include machines and tools. These machines and tools may be at least one of a robotic arm, a crawler, a faster installation system, a rail-based drilling system, or a robot. Assembly equipment 1510 can be used to assemble parts such as seats, horizontal stabilizers, wings, engines, engine housings, landing gear systems, and other parts for aircraft 1400 in FIG. 14.

In this illustrative example, maintenance system 1504 includes maintenance equipment 1512. Maintenance equipment 1512 can include any equipment needed to perform maintenance on aircraft 1400 in FIG. 14. Maintenance equipment 1512 may include tools for performing different operations on parts on aircraft 1400 in FIG. 14. These operations can include at least one of disassembling parts, refurbishing parts, inspecting parts, reworking parts, manufacturing replacement parts, or other operations for performing maintenance on aircraft 1400 in FIG. 14. These operations can be for routine maintenance, inspections, upgrades, refurbishment, or other types of maintenance operations.

In the illustrative example, maintenance equipment 1512 may include ultrasonic inspection devices, x-ray imaging systems, vision systems, drills, crawlers, and other suitable devices. In some cases, maintenance equipment 1512 can include fabrication equipment 1508, assembly equipment 1510, or both to produce and assemble parts that needed for maintenance.

Product management system 1500 also includes control system 1514. Control system 1514 is a hardware system and may also include software or other types of components. Control system 1514 is configured to control the operation of at least one of manufacturing system 1502 or maintenance system 1504. In particular, control system 1514 can control the operation of at least one of fabrication equipment 1508, assembly equipment 1510, or maintenance equipment 1512.

In this illustrative example, control system 1514 can include controller 140 in FIG. 1. In this illustrative example, controller 140 can receive composite part design 150 from composite part designer 110 and control the operation of fabrication equipment 1508 to manufacture composite part 102. In this illustrative example, fabrication equipment 1508 can include ply layup system 144 and curing system 148.

The hardware in control system 1514 can be implemented using hardware that may include computers, circuits, networks, and other types of equipment. The control may take the form of direct control of manufacturing equipment 1506. For example, robots, computer-controlled machines, and other equipment can be controlled by control system 1514. In other illustrative examples, control system 1514 can manage operations performed by human operators 1516 in manufacturing or performing maintenance on aircraft 1400. For example, control system 1514 can assign tasks, provide instructions, display models, or perform other operations to manage operations performed by human operators 1516. As depicted in these illustrative examples, controller 140 from FIG. 1 can be implemented in control system 1514 to manage at least one of the manufacturing or maintenance of aircraft 1400 in FIG. 14.

In the different illustrative examples, human operators 1516 can operate or interact with at least one of manufacturing equipment 1506, maintenance equipment 1512, or control system 1514. This interaction can occur to manufacture aircraft 1400 in FIG. 14.

Of course, product management system 1500 may be configured to manage other products other than aircraft 1400 in FIG. 14. Although product management system 1500 has been described with respect to manufacturing in the aerospace industry, product management system 1500 can be configured to manage products for other industries. For example, product management system 1500 can be configured to manufacture products for the automotive industry as well as any other suitable industries.

Thus, the illustrative embodiments provide a method, apparatus, and system for managing a composite part. An acceptable level of warpage is identified for the composite part. The warpage for the composite part is a change in the composite part as manufactured that deviates from design specifications for the composite part. Orientations in a stacking sequence for plies in the composite part are selected to form selected orientations in the stacking sequence such that manufacturing the composite part using the selected orientations in the stacking sequence results in the composite part having the acceptable level of the warpage and a desired strength.

In the illustrative example, one or more technical solutions are present that overcome a technical problem with manufacturing composite parts that have dimensions that deviate from specifications for the composite parts. In particular, one or more technical solutions are present in an illustrative example that reduce the number of shims that are installed in an object such as an aircraft. As a result, in the illustrative example, one or more technical solutions can provide a technical effect of reducing gaps between composite parts being assembled. In the illustrative example, the number of shims that are manufactured and installed can be reduced with composite parts having fewer gaps that need shims.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described.

For example, the component can have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for managing a composite part, the method comprising:
   identifying an acceptable level of a warpage for the composite part, wherein the warpage for the composite part is a change in the composite part as manufactured that deviates from design specifications for the composite part; and
   selecting candidate orientations in a stacking sequence for plies in the composite part to form selected orientations in the stacking sequence such that manufacturing the composite part using the selected orientations in the stacking sequence results in the composite part having the acceptable level of the warpage and a desired strength;
   performing a stress analysis on the composite part using the candidate orientations in the stacking sequence for the plies;
   using the candidate orientations in the stacking sequence as the selected orientations when the stress analysis indicates that the composite part has the desired strength for the composite part;
   selecting new orientations for the candidate orientations in the stacking sequence when the stress analysis on the composite part with the candidate orientations indicate that the composite part fails to have the desired strength;
   performing the stress analysis on the composite part using the new orientations for the candidate orientations in the stacking sequence for the plies; and
   repeating the selecting the new orientations and performing the stress analysis on the composite part using the new orientations for the candidate orientations in the stacking sequence for the plies until the desired strength is present in the composite part.

2. The method of claim 1, wherein the stress analysis comprises a simulation of a set of structural loads applied to the composite part.

3. The method of claim 1, wherein selecting the candidate orientations in the stacking sequence for the plies comprises:
   receiving user input made to a graphical user interface in a display system, wherein the user input selects sets of the candidate orientations displayed on the graphical user interface.

4. The method of claim 1 further comprising:
   manufacturing the composite part in a product management system using the selected orientations.

5. The method of claim 1 further comprising:
   controlling a ply layup system to layup the plies for the composite part using the selected orientations to form a composite layup; and
   curing the composite layup to form the composite part.

6. The method of claim 1, wherein the selected orientations comprise 90 degree plies, +45 degree plies, −45 degree plies, and 0 degree plies.

7. The method of claim 1, wherein the selected orientations comprise at least 10 percent of the plies having a 90 degree orientation.

8. The method of claim 1, wherein the selected orientations comprise at least 12.5 percent to 20 percent of the plies having a 90 degree orientation.

9. The method of claim 1, wherein the selected orientations comprise 40 percent to 50 percent of the plies having a 45 degree orientation.

10. The method of claim 1, wherein the composite part is a skin panel, a fairing, an engine housing, a stringer, a door, a wing, and a panel.

11. A composite part system comprising:
   a computer system; and
   a composite part designer in the computer system, wherein the composite part designer is configured to:
      identify an acceptable level of a warpage for a composite part, wherein the warpage is a change in the composite part as manufactured that deviates from design specifications for the composite part; and
      select candidate orientations in a stacking sequence for plies in the composite part to form selected orientations in the stacking sequence such that manufacturing the composite part using the selected orientations in the stacking sequence results in the composite part having the acceptable level of the warpage and a desired strength;
      perform a stress analysis on the composite part using the candidate orientations in the stacking sequence for the plies;
      use the candidate orientations in the stacking sequence as the selected orientations when the stress analysis indicates that the composite part has the desired strength for the composite part;
      select new orientations in the stacking sequence when the stress analysis on the composite part with the candidate orientations indicate that the composite part fails to have the desired strength;
      perform the stress analysis on the composite part using the new orientations in the stacking sequence for the plies; and
      repeat selecting the new orientations for the candidate orientations and performing the stress analysis on the composite part using the new orientations in the stacking sequence for the plies until the desired strength is present in the composite part.

12. The composite part system of claim 11, wherein the stress analysis comprises a simulation of a set of structural loads applied to the composite part.

13. The composite part system of claim 11, wherein in selecting the candidate orientations in the stacking sequence for the plies, the composite part designer receives user input made to a graphical user interface in a display system, wherein the user input selects sets of the candidate orientations displayed on the graphical user interface.

14. The composite part system of claim 11 further comprising:
   a controller in the computer system, wherein the controller is configured to control manufacturing the composite part in a product management system using the selected orientations.

15. The composite part system of claim 11 further comprising:
a controller in the computer system, wherein the controller is configured to control a ply layup system to layup the plies for the composite part using the selected orientations to form a composite layup and control a curing system to cure the composite layup to form the composite part.

16. The composite part system of claim 11, wherein the selected orientations comprise 90 degree plies, +45 degree plies, −45 degree plies, and 0 degree plies.

17. The composite part system of claim 11, wherein the selected orientations comprise at least 10 percent of the plies having a 90 degree orientation.

18. The composite part system of claim 11, wherein the selected orientations comprise from at least 12.5 percent to 20 percent of the plies having a 90 degree orientation.

19. The composite part system of claim 11, wherein the selected orientations comprise 40 percent to 50 percent of the plies having a 45 degree orientation.

20. The composite part system of claim 11, wherein the composite part is a skin panel, a fairing, an engine housing, a stringer, a door, a wing, and a panel.

21. A product management system comprising:
fabrication equipment;
a controller in communication with the fabrication equipment, wherein the controller is configured to control the fabrication equipment to manufacture a composite part using a part design that has selected orientations in a stacking sequence for plies in the composite part that result in the composite part having a warpage with an acceptable level of the warpage and a desired strength, wherein the warpage is a change in the composite part when manufactured that deviates from design specifications for the composite part; and
a composite part designer, wherein the composite part designer is configured to:
identify the acceptable level of the warpage for the composite part;
select candidate orientations in the stacking sequence to form the selected orientations for the plies in the composite part such that manufacturing the composite part using the selected orientations in the stacking sequence results in the composite part having the acceptable level of the warpage and the desired strength;
perform a stress analysis on the composite part using the candidate orientations in the stacking sequence for the plies;
use the candidate orientations in the stacking sequence as the selected orientations when the stress analysis indicates that the composite part has the desired strength for the composite part;
select new orientations in the stacking sequence when the stress analysis on the composite part with the candidate orientations indicate that the composite part fails to have the desired strength;
perform the stress analysis on the composite part using the new orientations in the stacking sequence for the plies; and
repeat selecting the new orientations for the candidate orientations and performing the stress analysis on the composite part using the new orientations in the stacking sequence for the plies until the desired strength is present in the composite part.

22. The product management system of claim 21, wherein the fabrication equipment comprises:
a ply layup system that lays up the plies for the composite part using the selected orientations to form a composite layup under control of the controller; and
a curing system that cures the composite layup to form the composite part under control of the controller.

23. The product management system of claim 21, wherein the selected orientations comprise 90 degree plies, +45 degree plies, −45 degree plies, and 0 degree plies.

24. The product management system of claim 21, wherein the selected orientations comprise at least 10 percent of the plies having a 90 degree orientation.

25. The product management system of claim 21, wherein the selected orientations comprise at least 12.5 percent to 20 percent of the plies having a 90 degree orientation.

26. The product management system of claim 21, wherein the selected orientations comprise 40 percent to 50 percent of the plies having a 45 degree orientation.

27. The product management system of claim 21, wherein the composite part is a skin panel, a fairing, an engine housing, a stringer, a door, a wing, and a panel.

\* \* \* \* \*